US007279535B2

(12) United States Patent
Konig et al.

(10) Patent No.: US 7,279,535 B2
(45) Date of Patent: Oct. 9, 2007

(54) METHOD FOR THE CONTINUOUS PRODUCTION OF POLYMERS MADE OF VINYL COMPOUNDS BY SUBSTANCE AND/OR SOLVENT POLYMERIZATION

(75) Inventors: Sven Konig, Grand Rapids, MI (US); Jessica Erwin, Hamburg (DE); Klaus Massow, Hamburg (DE); Stephan Zollner, Buchholz/Nordheide (DE)

(73) Assignee: tesa AG, Hamburg (DE)

( * ) Notice: Subject to any disclaimer, the term of this patent is extended or adjusted under 35 U.S.C. 154(b) by 0 days.

(21) Appl. No.: 10/555,472

(22) PCT Filed: May 18, 2004

(86) PCT No.: PCT/EP2004/005339

§ 371 (c)(1),
(2), (4) Date: Aug. 25, 2006

(87) PCT Pub. No.: WO2004/101626

PCT Pub. Date: Nov. 25, 2004

(65) Prior Publication Data

US 2006/0287443 A1    Dec. 21, 2006

(30) Foreign Application Priority Data

May 19, 2003 (DE) .................. 103 22 830

(51) Int. Cl.
  *C08F 2/44* (2006.01)
  *C08F 2/02* (2006.01)
(52) U.S. Cl. .................. 526/88; 526/64; 526/918; 427/208.4; 422/135; 422/137; 264/211.24
(58) Field of Classification Search .................. 526/88, 526/918, 64; 422/137, 135; 427/208.4, 427/294; 264/211.24
See application file for complete search history.

(56) References Cited

U.S. PATENT DOCUMENTS

| 3,825,236 A | 7/1974 | Hussman et al. |
| 4,591,487 A | 5/1986 | Fritsch |
| 4,619,979 A | 10/1986 | Kotnour et al. |
| 4,690,989 A | 9/1987 | Kolinsky et al. |
| 5,510,073 A * | 4/1996 | Kaegi et al. ........... 264/211.23 |
| 5,602,216 A | 2/1997 | Juvet |
| 5,726,258 A | 3/1998 | Fischer et al. |
| 6,288,162 B2 * | 9/2001 | Leugs et al. ................ 524/560 |
| 6,506,447 B1 * | 1/2003 | Hirsch et al. ............ 427/208.4 |
| 6,780,271 B1 | 8/2004 | Burmeister et al. |
| 2004/0024118 A1 * | 2/2004 | Weihrauch et al. ........ 525/54.3 |

FOREIGN PATENT DOCUMENTS

| DE | 23 03 366 | 7/1974 |
| DE | 30 30 541 | 2/1982 |
| DE | 33 05 727 | 8/1984 |
| DE | 36 21 429 | 1/1987 |
| DE | 36 05 003 | 8/1987 |
| DE | 39 08 415 | 9/1990 |
| DE | 44 33 487 | 3/1996 |
| DE | 195 18 255 | 11/1996 |
| DE | 195 34 813 | 3/1997 |
| DE | 94 21 955 U1 | 5/1997 |
| DE | 195 48 136 | 6/1997 |
| DE | 196 31 182 | 7/1997 |
| DE | 297 10 235 U1 | 8/1997 |
| DE | 198 06 609 | 8/1999 |
| DE | 199 15 916 | 10/2000 |
| DE | 297 24 790 U1 | 3/2004 |
| EP | 1 60 394 | 11/1985 |
| EP | 0 752 268 | 1/1997 |
| EP | 0 755 945 | 1/1997 |
| EP | 09 43 662 | 9/1999 |
| GB | 2177410 | 1/1987 |
| JP | 54-0 56 662 | 5/1979 |
| JP | 6-1 00 605 | 4/1994 |

OTHER PUBLICATIONS

Billmeyer, Jr., Textbook of Polymer Science, 2 ed., Wiley-Interscience, 280-284, 1971.*
Handbook of Pressure Sensitive Adhesive Technology, by Donatas Satas (van Nostrand, 1989).
Ullmann's Encyclopedia of Industrial Chemistry, $2^{nd}$ edn. vol. A21, 1992, 305 ff, VCH Weinheim.
Ullmann's Encyclopedia of Industrial Chemistry, $2^{nd}$ edn. vol. B4, 1992, 87 ff, VCH Weinheim.

* cited by examiner

*Primary Examiner*—Fred M. Teskin
(74) *Attorney, Agent, or Firm*—Norris McLaughlin & Marcus PA

(57) ABSTRACT

Production of vinyl polymers by the polymerization of vinyl monomers in a planetary gear extruder.

26 Claims, 3 Drawing Sheets

METHOD FOR THE CONTINUOUS PRODUCTION OF POLYMERS MADE OF VINYL COMPOUNDS BY SUBSTANCE AND/OR SOLVENT POLYMERIZATION

This is a 371 of PCT/EP2004/005339 filed 18 May 2004 (international filing date).

The present invention relates to an improved method for the continuous production of polymers made of vinyl compounds by substance (or bulk) and/or solvent (or solution) polymerization.

BACKGROUND OF THE INVENTION

The free-radical addition polymerization of vinyl monomers is known and has been extensively described (Ullmann's Encyclopedia of Industrial Chemistry, $2^{nd}$ edn. vol. A21, 1992, 305 ff, VCH Weinheim). Polymerizations are associated with a considerable evolution of heat and an increase in the viscosity. The high viscosities can lead to problems of mixing and hence also of heat removal and reaction control.

Polymerizations are carried out in a stirred tank or in other reactors which exhibit mixing internals for commixing and for heat removal (Ullmann's Encyclopedia of Industrial Chemistry, $2^{nd}$ edn. vol. B4, 1992, 87 ff, VCH Weinheim). However, in the case of reactions where a large quantity of reaction heat has to be supplied or removed, a process of this kind may prove difficult to carry out. This is so in particular if the fraction of solvents is low or if, indeed, a polymerization is carried out entirely in the absence of solvents.

Furthermore, reactors are known that are equipped with static mixing and cooling devices in such a way as to fill out their cross section. These static reactors, as they are known, are also operated as loop reactors in order to reduce the viscosity change within the reactor; in other words, a portion of the polymer solution is mixed with the feed, while another portion is taken from the reactor and polymerized further to completion in a downstream tube reactor as a plug flow. Reactors of this kind are described for example in EP 0 755 945 A1.

A simplification of this process consists in polymerization in a spiral coil heat exchanger (DE 199 15 916 A1) in which the tube volume does not exceed, generally, 10% of the total volume of the reactor. Disadvantages are the need for high pressures, and mixing problems at high viscosity.

It is known, moreover, to carry out polymerizations in a single-screw or twin-screw extruder, leading to advantages at high viscosity, described for example in U.S. Pat. No. 4,619,979 A. This process, however, leads to polymers having a relatively high gel fraction, of in some cases 55%. A further disadvantage is the low specific cooling area in comparison to that possessed by, for example, tube bundle reactors (EP 0 752 268 A1), thereby limiting the space-time yield.

Planetary roller extruders have been known for some time and were first used in the processing of thermoplastics such as PVC, for example, where their primary use is to charge downstream units such as calenders or roll mills, for example. As a result of their advantage of great surface renewal for material exchange and heat exchange, with which the energy introduced by friction can be rapidly and effectively removed, and also of the low residence time and narrow residence time spectrum, their field of use has expanded in recent times to embrace, among others, mixing and compounding operations which require a particularly temperature-controlled regime.

Planetary roller extruders exist, depending on the manufacturer, in different designs and sizes. Depending on desired throughput, the diameters of the roller barrels are typically between 70 mm and 400 mm.

Planetary roller extruders in existing design generally have a feed section and a process section, in which melting, cooling, mixing or compounding takes place.

The feed section consists of a conveying screw, to which all of the solid components are metered continuously. The conveying screw then passes on the material to the process section. However, there are also embodiments without a screw section, in which the planetary roller extruder is vertical and the material is fed directly between central (or sun) and planetary spindles.

The process section consists of one or more roller barrels, in series, located within which there is a driven central spindle (or sun spindle) and the planetary spindles. Roller sections, central spindle, and planetary spindles have a helical gearing which ensures material transport within the process section of the planetary roller extruder. The planetary spindles are driven by intermeshing by the central spindle. The rotational speed of the central spindle and hence the peripheral speed of the planetary spindles can be varied and are therefore an important parameter for controlling the operations.

The materials are circulated between central spindle and planetary spindles and/or between planetary spindles and helical gearing of the roller section in this way such that there is intensive material mixing and, respectively, effective heat exchange between the surfaces of the spindles and the roller barrels.

The number of planetary spindles rotating in each roller barrel can be selected and hence adapted to the requirements of the operation. The number of spindles exerts an influence on the free volume within the planetary roller extruder, and on the residence time of the material in the operation, and, additionally, determines the areal size for heat exchange and material exchange. With a constant roller barrel diameter, a greater number of spindles generally allows a better mixing action or a greater product throughput to be obtained. In this regime, however, the average residence time of the material is lower, which must be taken into account when carrying out residence time-orienting operations. The objective, therefore, is to adapt the fitting-out of the process section to the requirements of the operation in respect of thermodynamic requirements, efficiency, and product quality.

The maximum number of planetary spindles which can be installed between central spindle and roller barrel is dependent on the diameter of the roller barrel and on the diameter of the planetary spindles used. When using relatively large roller diameters, such as are necessary for achieving throughput rates on the production scale, or when using smaller diameters for the planetary spindles, the roller barrels can be fitted out with a greater number of planetary spindles. Typically, for a roller diameter of D=70 mm, up to seven planetary spindles are used, while for a roller diameter of D=200 mm, for example, ten spindles, and for a roller diameter of D=400 mm, for example, 24 planetary spindles can be used.

There are different embodiments of planetary spindles, which are adapted to the particular progress of operation. For instance, it may be advantageous to use planetary spindles which have interruptions over their periphery and, consequently, interrupt the inherently strict conveying characteristics of the helical gearing. The result of using this kind of spindle in one or more roller barrels is an increased axial transverse mixing, which allows the breadth of the molecular weight distribution to be reduced and the polymer to be adapted to the requirements.

Attention is drawn in this context to the patent applications and utility model DE 196 31 182 A1, DE 94 21 955 U1, DE 195 34 813 A1, DE 195 18 255 A1, and DE 44 33 487 A1, which represent an overview of the state of the art in the field of planetary roller extruders.

Thus, furthermore, DE 39 08 415 A1 describes the processing of rubber mixtures or rubberlike mixtures by means of planetary roller extruders. For the purpose of further processing on downstream devices, pre-batches or ready-produced mixtures are masticated and plasticated on a planetary roller extruder. Likewise described is the production of ready-produced mixtures in the planetary roller extruder. In this case, vulcanizing systems and other components are metered in to the rubber premixes.

DE 297 10 235 U1 discloses an apparatus for plasticating polymeric material, said apparatus being composed of at least two planetary roller extruders in parallel arrangement. The planetary roller extruders feed a common discharge stage, which in its turn may be a single-screw extruder, an inter-screw extruder or a gear pump. Between the planetary roller extruders and the discharge stage there may also be a devolatilizing unit, preferably composed of a downshaft acted on by vacuum.

In U.S. Pat. No. 3,825,236 A as well the use of a planetary roller extruder is shown, this extruder being located within a single-screw extruder. DE 23 03 366 A1 produces an extrudable composition comprising thermoplastic or thermoset polymer in screw extrusion presses with planetary rollers, the polymer, in the form of pellets or powder, after stuffing, being masticated and plasticated in the region of the planetary rollers and also compressed to extrusion pressure. Claimed therein as being essential to the invention is that, up until solid bodies are formed, the stuffed polymer is precompressed, then comminuted in the intake region of the planetary rollers, with pressure reduction, and also masticated, plasticated, and compressed to extrusion pressure.

DE 198 06 609 A1 discloses a process for the continuous solvent-free and mastication-free production of self-adhesive compositions based on non-thermoplastic elastomers in a continuously operating planetary roller extruder having a feed section and a compounding section, the compounding section of the planetary roller extruder being formed by at least one roller barrel.

The process is composed of the following steps:
a) feeding the solid components of the self-adhesive composition, such as elastomers and resins, into the feed section of the planetary roller extruder, where appropriate, feeding fillers, dyes and/or crosslinkers,
b) transferring the solid components of the self-adhesive composition from the feed section to the compounding section,
c) adding the liquid components of the self-adhesive composition, such as plasticizers, crosslinkers and/or further tackifying resins, to the compounding section,
d) preparing a homogeneous self-adhesive composition in the compounding section, and
e) discharging the self-adhesive composition.

It is an objective of the present invention to provide a method for the continuous polymerization of vinyl monomers to vinyl polymers that does not have the disadvantages of the prior art, or at least not to the same extent.

SUMMARY OF THE INVENTION

The invention accordingly provides a method for the continuous polymerization of vinyl monomers to vinyl polymers, wherein the polymerization takes place in a planetary roller extruder.

In a first advantageous embodiment of the method of the invention the vinyl polymers it produces have molecular weight $M_w$ of more than 400 000 g/mol and/or polydispersities ($M_w/M_n$) of greater than 5.

It is further preferred if the polymerization takes place without addition of solvent.

A further advantageous variant of the method of the invention is distinguished by the fact that the polymerization
a.) takes place in a hydraulically filled planetary roller extruder,
b.) is carried out by thermally induced decomposition of free radical-forming initiators,
c.) takes place in the presence of 0 to 25% by weight of a solvent, based on the vinyl monomers, and/or
d.) is carried out in the presence of resin or plasticizers in fractions of 0 to 30% by weight, preferably in fractions of 0 to 10% by weight, more preferably in fractions of 0 to 5% by weight.

DETAILED DESCRIPTION

For the method of the invention the planetary roller extruder is preferably operated in such a way that it is completely filled with the reaction mixture. Owing to this so-called hydraulic filling it is possible to keep the reaction chamber free from oxygen, which hinders the polymerization, and, for a given volume stream, to increase the average residence time as compared with partial filling. Both factors serve for optimum utilization of the extruder section. Rendering the reaction volume inert is also possible, however, by flushing with inert gas, nitrogen for example. The most advantageous for the onset behavior of the reaction is to render the reactor inert beforehand, using nitrogen, and, by charging it with the reaction mixture to obtain hydraulic filling.

For the addition of the reaction mixture this means that the planetary roller extruder is operated without the feed section which is otherwise customary—in other words, without the single screw upstream of the central spindle—but, instead, exclusively with the abovementioned process section. One possible embodiment of this is the replacement of the single screw coupled to the central spindle by, for example, a metallic shaft (1) as in FIG. 1 between gearing and central spindle, at the end of which shaft there is a floating ring seal (2) which seals off the entrance of the process section in a liquid-tight and gas-tight manner.

The reaction mixture is then added continuously via a hole (3) at the start of the first roller barrel, directly onto the central spindle and, respectively, onto the rotating planetary spindles (9a to 9c).

The monomers can be metered continuously to the polymerization reactor, both individually and as a mixture. Complexity is reduced if a premix is produced from the monomers and this premix is free from oxygen by means of evacuation or flushing with nitrogen, or a combination thereof, and then supplied to the planetary roller extruder. Premixing of monomers is necessary in any case if one or more of the monomers used is in solid form and cannot be supplied in melted form to the polymerization reactor.

When using a planetary roller extruder consisting of two or more roller barrels (7a to 7c) in series, it is possible, via holes (4 and 5) drilled in the connecting flanges of the roller barrels, to add further substances such as initiators or initiator mixtures, melted resins, plasticizing resins, solvents, chain transfer agents or other plasticizing agents compatible with an adhesive, such as plasticizers or oils, to the polymerization operation.

With the subsequent metering of suitable initiators or initiator mixtures it is possible to obtain high conversions without at the same time, as a result of a high primary-radical concentration, inducing low molecular weights or gelling of the polymer.

With the inventive addition of resins or plasticizers it is possible to lower the viscosity of the reaction mixture and hence the reaction rate to such an extent that the gelling tendencies which occur in the case of substance (or bulk) polymerizations, in other words in polymerizations without solvent, to an increased extent in the polymer, owing to high viscosities (gel effect), can be prevented. As a result of the efficient mixing action of the planetary roller extruder, in combination with its extremely high heat exchange area, the reaction mixture is mixed so effectively, even in the case of substance (or bulk) polymerizations, i.e. reactions without solvent, that the gelling tendencies are substantially reduced, in contrast to the prior art.

Heat exchange takes place by a central spindle (8) and roller barrels (7a to 7c) which for that purpose are operated via heaters/coolers with temperature-control medium (12 to 18). Care should be taken to ensure a temperature regime which takes account of the progress of the reaction, and hence attention should be paid to the concentration of primary radicals. Thus a high primary-radical concentration should not be produced immediately at or after the start of polymerization, in order, on the one hand, to obtain high molecular weights and, on the other, to avoid gelling tendencies on the part of the polymer. In order to be able to run a wide spectrum of formulas and to be able to tailor the properties of the polymers, a flexible temperature regime is necessary; therefore it is advantageous to use separate temperature-control circuits for the central spindle and the roller barrels and, furthermore, to equip the roller barrels with more than one temperature control circuit.

For the method of the invention, on thermodynamic grounds, water, or pressurized water, is a preferred temperature-control medium, although the method is not limited thereto.

In one advantageous embodiment of the method, the mixture of the vinyl monomers is preheated, prior to entering the planetary roller extruder, to temperatures of more than 50° C., preferably to temperatures above 70° C., and more preferably to temperatures of more than 85° C., in order to ensure a rapid start of reaction and to ensure effective utilization of the extruder section. The level of the preheating temperature depends on the initiator system specifically selected, and should be selected such that polymerization does not occur even outside the reactor, leading to clogging of the feed devices.

With further preference, liquid initiators are cooled and are added to the vinyl monomers not until immediately before entry of the monomer stream into the planetary roller extruder, the initiators being continuously distributed therein by means of suitable mixing systems. Examples of suitable mixing systems include conventional static mixers, mixers of the kind known as micromixers, or customary dynamic mixers with low input of shear energy. With solid initiators, it is preferred to prepare concentrated solutions in a monomer or in a monomer mixture, which for the purpose of improved stabilization are kept chilled in a reservoir. These monomer-dissolved initiators are then admixed to the main stream of monomers immediately prior to entry into the planetary roller extruder, the selection of the mixing systems being subject to the remarks made above.

There exists a plurality of advantageous method variants with which the planetary roller extruder is operated.

First of all, central spindle and planetary spindles may rotate counter to the material conveying direction normally induced by the helical gearing, the conveying of the reaction mixture within the planetary roller extruder taking place by means of the preferred feed pump for the vinyl monomers. This procedure is preferentially suitable if the polymers produced have only low viscosities, so that the pressure losses occurring within the planetary roller extruder and also the backward conveying of the material induced by the rotations of the spindles, in the direction of reactant feed, can be overcome by the preferred feed pump. As an example of this, mention may be made of polymers with low degrees of polymerization, with fractions of solvents or plasticizers, and also polymers from reactions which are not taken to high conversions. Latter polymers are generally referred to as prepolymers. The transport of material in the direction of the exit aperture of the planetary roller extruder, which is not assisted by the spindles, produces hydraulic filling of the reaction chamber with monomer or polymer, respectively, throughout the reaction phase and, as compared with partial filling, increases the average residence time of the reaction mixture within the assembly.

It is also possible for central spindle and planetary spindles to rotate in the same direction as the material conveying direction usually induced by the helical gearing. This procedure is employed if, as a result of high degrees of polymerization and/or high conversions, or as a result of complete absence of solvents or plasticizers, the viscosities occurring within the polymerization reactor are so high that the associated pressure losses can no longer be overcome by the feed pump of the reactants, and instead material transport must be forced via the rotation of the helically-geared spindles. The inventively preferred hydraulic filling of the reaction chamber with reaction mixture can be achieved, then, in the case of this procedure by the product exit aperture of the planetary roller extruder being situated higher than the addition opening for the liquid reactants. This is most easily achieved by means of a tube (10) which is mounted on the exit aperture of the planetary roller extruder (6) and whose exit (11) lies above the maximum product fill level within the planetary roller extruder. However, an oblique or vertical placement of the planetary roller extruder are also possible for this purpose.

With further preference, further initiators or initiator mixtures are added at at least one site downstream of the process section of the planetary roller extruder.

For the polymerization—as already stated—initiators are necessary.

In one advantageous embodiment the initiators for initiating the reaction have half-lives of 10 hours at temperatures of less than 120° C. and are selected from the group of the azo initiators, from the group of the organic peroxides, or from mixtures of initiators of the groups stated, preferably those having a crosslinking efficiency of less than 20%, in particular those having a crosslinking efficiency of less than 10%.

The initiators added downstream of the process section advantageously have half-lives of 10 hours at temperatures of more than 50° C. and are selected from the group of the azo initiators, from the group of the organic peroxides, or from mixtures of initiators of the groups stated.

Solvents used are preferably esters of saturated carboxylic acids (such as ethyl acetate), aliphatic hydrocarbons (such as n-hexane, n-heptane or cyclohexane), ketones (such as acetone or methyl ethyl ketone), mono and polyhydric aliphatic alcohols (such as methanol, ethanol, isopropanol, butanol or butanediol, for example), special-boiling-point spirit, aromatic solvents such as toluene or xylene, or mixtures of aforementioned solvents. For the polymerization in aqueous media or in mixtures of organic and aqueous solvents, it is preferred to add emulsifiers and stabilizers to the polymerization.

It is advantageous, furthermore, if the vinyl monomers contain compounds and/or the reaction mixture which has already been initially polymerized is supplied with compounds which lower the molecular weight during the polymerization, known as regulators. These compounds can be selected from the group of the nitroxyl compounds, thiols, TEMPO derivatives, thioesters, thiocarbonates, alcohols, ethers, and halogenated hydrocarbons, and may be present in fractions of 0 to 5% by weight, preferably 0 to 3% by weight, more preferably 0 to 1% by weight, with respect to the vinyl monomers employed.

In a further advantageous embodiment of the method of the invention, liquid resins, resin melts or plasticizers are added, in fractions of 0 to 30% by weight, preferably in fractions of 0 to 10% by weight, more preferably of 0 up to 5% by weight to the reaction mixture after the start of the reaction.

Tackifying resins for addition that can be used include, without exception, all known tackifying resins described in the literature. As representatives, mention may be made of the pinene resins, indene resins and rosins, their disproportionated, hydrogenated, polymerized and esterified derivatives and salts, the aliphatic and aromatic hydrocarbon resins, terpene resins and terpene-phenolic resins, and $C_5$, $C_9$, and other hydrocarbon resins. Any desired combinations of these and further resins may be used in order to adjust the properties of the resultant adhesive in accordance with what is required. Generally speaking, it is possible to use any (soluble) resins compatible with the polymer in question. Express reference may be made to the depiction of the state of knowledge in the "Handbook of Pressure Sensitive Adhesive Technology", by Donatas Satas (van Nostrand, 1989).

With particular advantage more than 30%, preferably more than 45%, of the vinyl monomers are reacted to vinyl polymers.

Furthermore, the vinyl polymers are preferably free from their volatile constituents. The separation of the volatile constituents may take place inline with the production operation of the vinyl polymers.

The vinyl polymers produced by the method of the invention are outstandingly suitable to be used in a downstream process stage as vinyl prepolymers for producing pressure-sensitive, preferably solvent-free and pressure-sensitive, self-adhesive compositions.

Advantageously for this purpose the vinyl polymers or the vinyl polymer compounds are applied inline with the production operation to carrier materials in web form, so that self-adhesive tapes result.

The determination of the average molecular weights $M_n$ (number average) and $M_w$ (weight average) and of the polydispersity D is made by means of gel permeation chromatography. The eluent used is THF containing 0.1% by volume trifluoroacetic acid. Measurement is made at 25° C. The precolumn used is PSS-SDV, 5µ, $10^3$ Å, ID 8.0 mm×50 mm. Separation is carried out using the columns PSS-SDV, 5µ, $10^3$ and also $10^5$ and $10^6$ each of ID 8.0 mm×300 mm.

The sample concentration is 4 g/l, the flow rate 1.0 ml per minute. Measurement takes place against polystyrene standards.

With regard to the continuous polymerization of vinyl monomers to vinyl polymers, the method displays advantages such as could not have been foreseen.

Surprisingly it was found that the mixing properties in the planetary roller extruder, together with the high specific surface area, impact particularly well on the polymerization of vinyl monomers. The high specific surface area allows rapid and extensive heat removal, so that rapid exothermic reactions can be carried out safely in the planetary roller extruder. Furthermore, this assembly has great advantages in connection with the mixing of polymers of very high molecular weight, which has positive consequences particularly for the production of pressure-sensitive adhesives. It has been found that, in the planetary roller extruder, polymerizations can be carried out in bulk, in other words without additional solvent, and with a high space-time yield.

The intention of the text below is to illustrate a particularly advantageously configured method, by means of figures, without wishing thereby to subject the invention to any unnecessary restriction.

BRIEF DESCRIPTION OF THE DRAWINGS

FIG. 1 shows the planetary roller extruder of the invention, which is composed of three roller barrels (7a to 7c) in series, and whose hydraulic filling is achieved by virtue of its process section being sealed off from the feed section, that it normally present, by means of a floating ring seal, in a gas-tight and liquid-tight manner, and that the product outlet (11) is arranged above the maximum fill level within the planetary roller extruder.

(12) to (17) show by way of example the heat exchange via the roller barrels, for which two separate heating/cooling circuits are used for each roller barrel.

Heat exchange in the case of the central spindle is preferably via a separate temperature control circuit (18).

Figure 1:
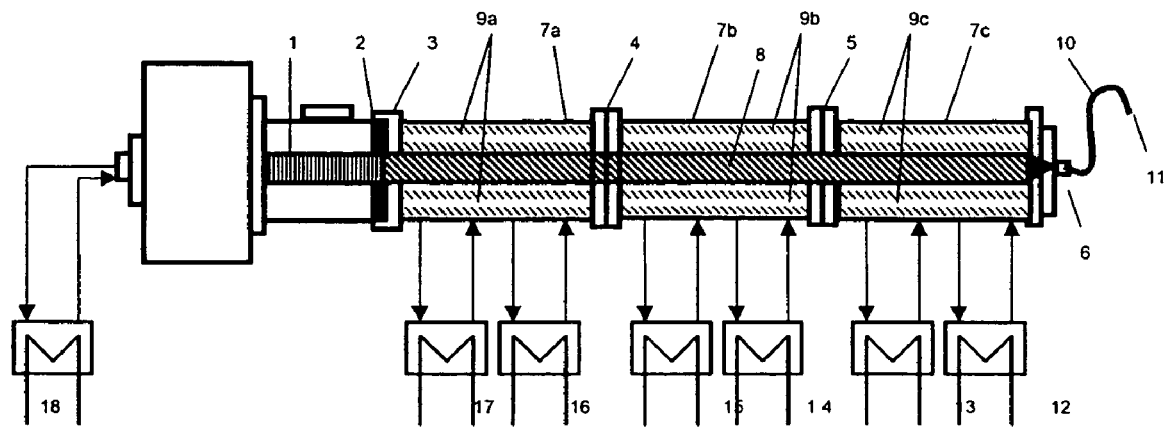
FIG. 1 shows a planetary roller extruder configuration which is typically used.
Figure 2:
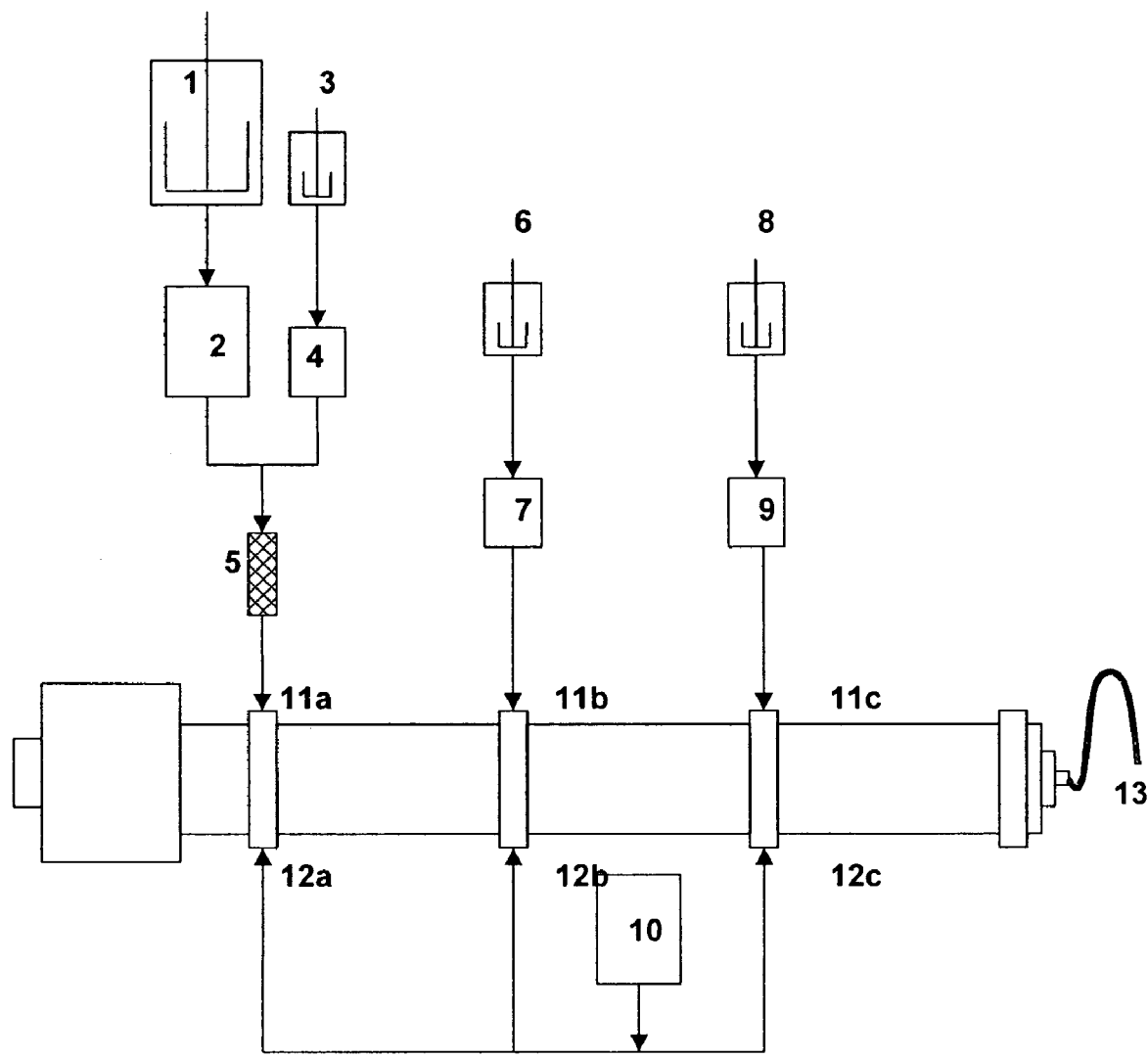
FIG. 2 shows the process scheme of the invention with a hydraulically filled planetary roller extruder from FIG. 1 and with the feed units for the feedstock components.

FIG. 2 shows diagrammatically the process scheme of the invention, with a hydraulically filled planetary roller extruder from FIG. 1, and also with the feed units for the feedstock components. To aid comprehension, the conveying elements, metering or flow-rate measurement systems, temperature control facilities, and nitrogen feed lines have not been shown, since they themselves are not subject matter of the invention; instead, versions in standard commercial form can be used for these components.

Where two or more components are employed or when a solid monomer is used that is soluble in the liquid monomers, a premix is prepared from the monomers and, if desired, further additions such as chain transfer agents, for example, in a monomer mixing vessel (1), and this premix is subsequently transferred to a reservoir tank (2). The main stream of monomers is taken continuously from this monomer tank (2) and pumped into the mixing unit (5). The mixing vessel (1) and the reservoir tank (2) possess a nitrogen supply in order to free the monomer or the monomer mixture from oxygen. Moreover, they are of temperature-controllable design, in order to preheat the monomer mixture appropriately.

When a solid initiator is used for initiating the reaction, it is predissolved in a small amount of monomer in an initiator mixing vessel (3). The possibility also exists of mixing in further solid or liquid initiators in the mixing vessel (3), in order thus to obtain a reaction course which is favorable for the polymerization. The initiator mixing vessel (3) and the associated reservoir tank (4) possess a nitrogen supply in order to keep the monomeric initiator solution free from oxygen. Where the reaction is initiated with only one initiator, which, moreover, is liquid, said initiator can also be filled directly into the initiator reservoir tank (4), without producing a premix with monomer. Initiator mixing vessel (3) and reservoir tank (4) preferably possess a cooler, in order reliably to avoid premature decomposition of initiator and hence a premature initiation of reaction outside the planetary roller extruder.

The initiator solution from the reservoir tank (4) is conveyed continuously into the mixing unit (5), where it is mixed homogeneously with the main stream of monomer mixture from reservoir tank (2), before the reaction mixture thus produced is conveyed into the first opening of the planetary roller extruder (11a). The concentration of initiator in the reaction mixture can be set and/or varied in a defined way via the concentration of initiator solution in reservoir tank (4) and the amount of initiator solution in relation to the main stream of monomer mixture.

Each of the two streams from the reservoir tanks (2 and 4) is adjusted and regulated separately by way of pumps. The metering streams can take place in this case, for example, by back-weighing of the reservoir tanks, which stand on weighing cells, or by way of continuous mass flow-rate measurement and control systems, operating for example in accordance with the principle of Coriolis force. Volumetric metering systems are also possible, but on account of their reduced accuracy are not preferred.

The mixing unit (5) and the downstream lines are of temperature-controllable design, in order to heat the reaction mixture to a temperature in the vicinity of the temperature level at which the reaction is initiated by the induced decomposition of initiator. As a result, the process section of the planetary roller extruder, which serves as polymerization reactor, is utilized optimally. Suitability as mixing unit (5) is possessed, for example, by static mixers, micromixers or else continuously operating dynamic mixers with small volumes.

Excessive initial concentrations of initiators should be avoided, since this leads to high reaction rates with high levels of heat given off. The consequence may be uneven heat removal, which is often associated with an increased tendency toward unwanted gelling. For this reason, only a portion of the initiator needed for a high conversion is introduced via the first feed opening (11a) in the planetary roller extruder; there is an after feed, as it is known, of initiator during ongoing polymerization via further, downstream openings (11b and 11c) in the planetary roller extruder. At this point it is preferred to use liquid initiators or mixtures thereof. However, concentrated solutions of the initiators in monomers are also conceivable and within the scope of this invention. Furthermore, further additions, such as substances which lower the degree of polymerization, for example can be added to the initiators via the mixers (6 and 8). The mixtures are then filled into the corresponding reservoir tanks (7 and 9), from which they are then metered continuously into the polymerization reactor. Handling and supply take place in the same way as described above into the planetary roller extruder. The respective feed ports at the metering openings (11b and 11c) are of temperature-controllable design, in order to prevent them heating up via the hot barrel walls and hence to prevent premature decomposition of the polymerization initiators.

In order to lower the high reaction rate, which is based on the gel effect, and to avoid the unwanted gelling in the polymer that is frequently associated with this, it is advantageous in accordance with the present invention to add fractions of substances that lower the viscosity of the polymer mixture, during the polymerization operation. These substances may be plasticizers or else resins or plasticizing resins or else solvents, which are held in a reservoir tank (10). Their proportion should only be such that they do not substantially halt the progress of the polymerization. These viscosity-lowering substances are added preferably after the beginning of polymerization, via separate metering openings (12b and 12c) in the planetary roller extruder. Particularly for fast-reacting mixtures with high exotherms, however, the addition of small fractions at the start of the reaction (12a) may also be advantageous. Owing to the design of planetary roller extruders, it is necessary when using solid resins to melt them before metering them, and to meter them in liquid melt form to the planetary roller extruder. In that case, temperature control of the reservoir tank (10) and of all product-carrying components is necessary.

The vinyl polymer or vinyl prepolymer departs the planetary roller extruder, which serves as the polymerization reactor, via the exit aperture (13), after which it is supplied either straight to a downstream coating unit or first to an enhancement operation. An example of this is shown by FIG. 3.

Figure 3:
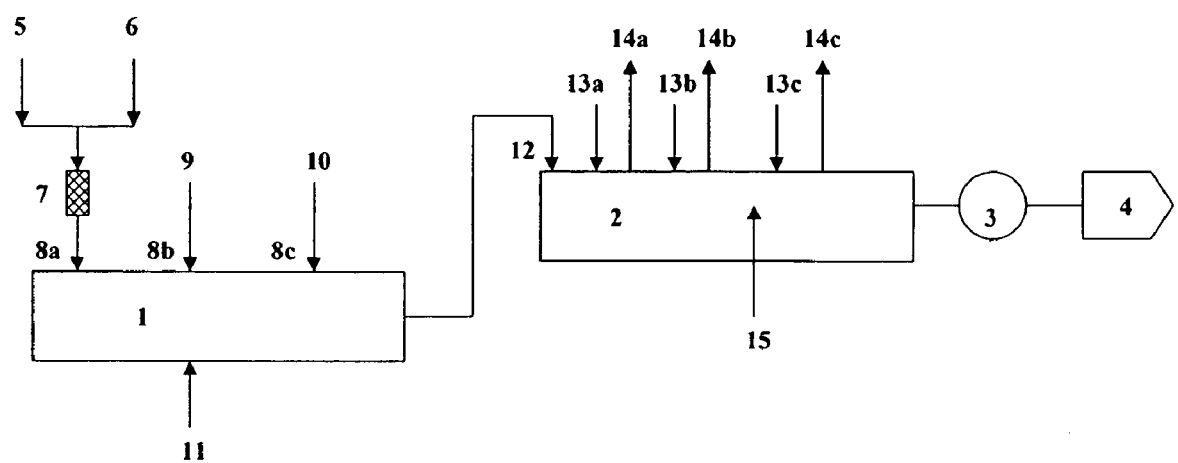
FIG. 3 shows the two-stage method of the invention for a continuous, solvent-free polymerization in a planetary roller extruder with downstream removal of residual monomers and with compounding to give a pressure-sensitive self-adhesive composition, which is subsequently supplied inline to a coating unit.

FIG. 3 shows the inventive two-stage method of a continuous solvent-free polymerization in a planetary roller extruder (1) with downstream removal of residual monomers and also compounding to give a pressure-sensitive self-adhesive composition which is subsequently supplied inline to a coating unit.

For this purpose, a mixture of monomers (5) and a concentrated monomeric initiator solution (6), which if desired contains chain transfer agent, is guided via a static mixer (7), in which it is mixed homogeneously, and is preheated and metered into the first entry opening (8a) of the planetary roller extruder (1) of the invention, in which the reaction starts immediately following entry and there is a rapid rise in the viscosity. By adding a quantity of resin melt (11) the viscosity is lowered, thereby evening out the removal of heat and suppressing the tendency toward gelling within the polymer. In order to obtain a maximum conversion, further initiators (9, 10) or mixtures thereof are metered in downstream via the extruder openings (8b and 8c).

The vinyl polymer formed is then guided via a port (12) into a downstream extruder (2), where, under the influence of heat and vacuum (14a-c) and with the aid of so-called entrainers (13a-c) such as water or nitrogen, it is freed from a large fraction of unreacted monomers. Furthermore, in the second extruder, additional substances (15) can be added and mixed to a homogeneous vinyl polymer compound, such as is typically used for producing pressure-sensitive self-adhesive compositions. These substances may be tackifying resins, crosslinkers or else other modifying ingredients. Suitable extruders (2) for this operation include single-screw extruders, but also twin-screw or multiscrew extruders.

The pressure-sensitive adhesives produced in this way are preferably passed by means of a downstream melt pump (3) to a coating unit (4) for carrier materials in web form. This coating unit may be any assembly suitable for the processing of adhesives having these molecular weights and/or viscosities. Mention may be made here by way of example of extrusion dies, roll applicators or calender applicators.

We claim:

1. A method for the continuous polymerization of vinyl monomers to vinyl polymers, wherein the polymerization takes place in a hydraulically filled planetary roller extruder and the polymerization
   a) is carried out by thermally induced decomposition of free radical-forming initiators,
   b) takes place in the presence of 0 to 25% by weight, based on the vinyl monomers of a solvent, and/or
   c) is carried out in the presence of resin or plasticizers in fractions of 0 to 30% by weight.

2. The method for continuous polymerization of vinyl monomers to vinyl polymers of claim 1, wherein the vinyl polymers have a molecular weight $M_w$ of more than 400 000 g/mol and/or polydispersities ($M_w/M_n$) of greater than 5.

3. The method of claim 1, wherein the polymerization takes place without addition of solvent.

4. The method of claim 1, wherein the hydraulic filling of the planetary roller extruder with reaction mixture takes place by means of
   a) the planetary roller extruder having a material exit aperture which is situated higher than the maximum fill level of the reaction mixture within the roller barrels,
   b) central spindle and planetary spindles rotate counter to the material conveying direction normally induced by the helical gearing, the conveying of the reaction mixture within the planetary roller extruder then taking place by means of a feed pump for the vinyl monomers.

5. The method of claim 1, wherein the mixture of the vinyl monomers is preheated, prior to entering the planetary roller extruder, to temperatures of more than 50° C.

6. The method of claim 1, wherein the initiators are cooled and are added to the vinyl monomers not until immediately before entry of the monomer stream into the planetary roller extruder.

7. The method of claim 1, wherein further initiators are added at at least one further site downstream of the process section of the planetary roller extruder.

8. The method of claim 1, wherein the initiators for initiating the reaction have half-lives of 10 hours at temperatures of less than 120° C. and are selected from the group consisting of azo initiators, organic peroxides, and mixtures thereof.

9. The method of claim 1, wherein initiators are added downstream of the process section, said initiators having half-lives of 10 hours at temperatures of more than 50° C. and being selected from the group consisting of azo initiators, organic peroxides and mixtures thereof.

10. The method of claim 1, wherein the vinyl monomers contain compounds and/or the reaction mixture which has already been initially polymerized is supplied with compounds which lower the molecular weight during the polymerization, said compounds being selected from the group consisting of nitroxyl compounds, thiols, TEMPO derivatives, thioesters, thiocarbonates, alcohols, ethers, and halogenated hydrocarbons, and are present in amounts of 0 to 5% by weight, with respect to the vinyl monomers employed.

11. The method of claim 1, wherein liquid resins, resin melts or plasticizers are added in amounts of 0 to 30% by weight, to the reaction mixture after the beginning of polymerization.

12. The method of claim 1, wherein more than 30% of the vinyl monomers are reacted to vinyl polymers.

13. The method of claim 1, wherein the vinyl polymers are freed from their volatile constituents.

14. The method of claim 1, wherein the vinyl polymers are admixed inline with further substances selected from the group consisting of tackifying resins, fillers, crosslinkers and crosslinker assistants and, in this way, vinyl polymer compounds are prepared which find use as pressure-sensitive self-adhesive compounds.

15. The method of claim 1, wherein the vinyl polymers are used in a downstream process stage as vinyl prepolymers for producing pressure-sensitive self-adhesive compounds.

16. The method of claim 1, wherein the vinyl polymers are applied inline to the production operation to carrier materials in web form.

17. The method of claim 1, wherein said fraction of resin or plasticizer is 0 to 10% by weight.

18. The method of claim 17, wherein said fraction of resin or plasticizer is 0 to 5% by weight.

19. The method of claim 5, wherein said temperatures are above 70° C.

20. The method of claim 19, wherein said temperatures are above 85° C.

21. The method of claim 8, wherein said initiators have a crosslinking efficiency of less than 20%.

22. The method of claim 21, wherein said initiators have a crosslinking efficiency of less than 10%.

23. The method of claim 10, wherein said compounds which lower the molecular weight are present in amounts of 0 to 3% by weight.

24. The method of claim 23, wherein said compounds which lower the molecular weight are present in amounts of 0 to 1% by weight.

25. The method of claim 13, wherein said vinyl polymers are freed from their volatile constituents inline.

26. The method of claim 14, wherein the vinyl polymer compounds are applied inline to the production operation to carrier materials in web form.

* * * * *